United States Patent [19]
Chiacchio et al.

[11] Patent Number: 5,114,806
[45] Date of Patent: May 19, 1992

[54] PERFORATED RETAINER FOR HORIZONTAL MOUNT GELLED-ELECTROLYTE CELLS

[76] Inventors: Frank J. Chiacchio, 1746 Crowder Ave., Reading, Pa. 19607; Frank L. Tarantino, 901 York Ave., Lansdale, Pa. 19446

[21] Appl. No.: 671,382

[22] Filed: Mar. 19, 1991

[51] Int. Cl.$^5$ .................................. H01M 10/12
[52] U.S. Cl. ............................ 429/126; 429/190; 429/225
[58] Field of Search ............... 429/126, 190, 225, 129, 429/247, 134, 135

[56] References Cited

U.S. PATENT DOCUMENTS

| | | | |
|---|---|---|---|
| 1,768,906 | 7/1930 | Hawk | 429/126 |
| 3,711,332 | 1/1973 | Bastacky | 429/190 X |
| 4,303,743 | 12/1981 | Reau | 429/190 X |
| 4,894,300 | 1/1990 | Kugler | 429/190 |

Primary Examiner—Anthony Skapars
Attorney, Agent, or Firm—Frank J. Benasutti

[57] ABSTRACT

A perforated retainer is installed just under the top surface of the gelled electrolyte in a lead-acid storage battery to prevent the gel from crumbling and separating from the element plates when the battery is mounted horizontally. The size and density of the perforations are such that the retainer does not impede the initial introduction of the electrolyte solution. An the solution "gels", it cannot penetrate back through the retainer, but normal gas migration is not impeded by the retainer.

2 Claims, 2 Drawing Sheets

PERFORATED RETAINER FOR HORIZONTAL MOUNT GELLED-ELECTROLYTE CELLS

BACKGROUND OF THE INVENTION

1. Field of the Invention

This invention relates to the general field of gelled-electrolyte storage batteries, and more particularly to a perforated electrolyte retainer which allows such battery cells to be mounted in a horizontal position.

2. Description of the Prior Art

Gelled electrolyte has long been used for lead-acid batteries intended for applications requiring an immobilized electrolyte. It is also frequently used for its gas recombinant properties. The properties of such batteries, and of the common compositions of gelled electrolytes using various proportions of silica or other gelling agents, are well known in the industry, and consequently will not be further described herein.

Sealed gas-recombinant gelled electrolyte cells are often mounted in racks or modules that are stacked and connected to assemble a stationary battery of the required voltage and capacity. Space and access considerations frequently dictate that the cells be placed in a horizontal position; that is, with the open space between the electrode plates and the container cover lying horizontal to the plates, rather than above them. Unfortunately, the horizontal orientation allows the dried electrolyte at what had originally been the top of the cell to crumble along the fissures created during hardening, separate from the plates, and fall into the open space toward the container cover. This process is progressive over discharge/charge cycles, even for low discharge "float" cycling. Excessive electrolyte separation from the plates will eventually decrease battery performance and useful life.

A battery specifically designed for horizontal mounting is disclosed in U.S. Pat. No. 4,894,300. The battery uses a filler material, such as an air-hardening polyurethane foam, to fill between the cover and the electrolyte over about half of the open space, that half being specifically the one surrounding the positive terminal post, with the space surrounding the negative post left open to collect gases and relieve internal gas pressure through a regulator valve. An angled partition holds the foam in the proper shape until it hardens. Although the patent describes the purpose of the foam as preventing liquid sulfuric acid from accumulating between the cover and the gel layer, it will inherently prevent gel crumbling in the filled space. The open space surrounding the negative post will still experience crumbling and separation from the plates. Further, as described in its specification, the battery of U.S. Pat. No. 4,894,300 is properly mounted in only one horizontal configuration; that is, with the negative terminal directly over the positive.

The present invention treats the problem of gel crumbling and separation directly. Among the objectives sought to be achieved is a substantial reduction of surface crumbling of the gel to prevent separation from the electrode plates over the normal battery life. It is also an objective that the cells not be limited to a specific horizontal mounting position, and that any structure used to reduce gel crumbling be easily integrated into the battery manufacturing process.

SUMMARY OF THE INVENTION

A perforated sheet of non-conducting material is fit around the positive and negative terminal posts and against the four interior walls of the container, such that it occupies the whole width and length of the container just below the electrolyte fill level. The perforations allow the liquid electrolyte to pass and fill the container around and between the element plates during the manufacturing process; then after the electrolyte has thickened and dried to a gel, it acts as a mesh retainer just below the gel's top surface. There it provides structural resistance to gel crumbling and keeps the gel in contact with the electrode plates. The perforations allow gas migration to the surface and venting at the cover.

DETAILED DESCRIPTION OF THE INVENTION

Figure 1:
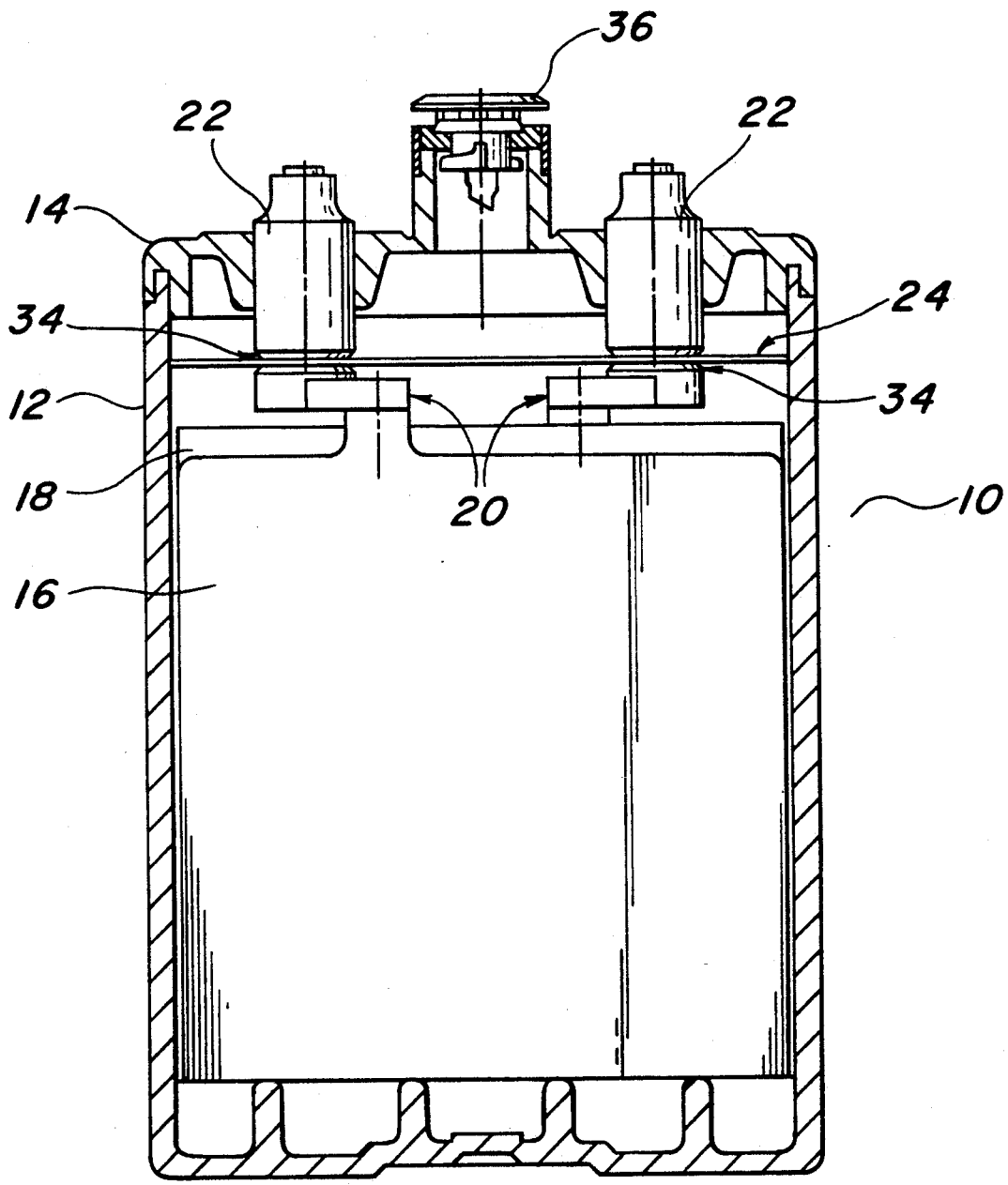
FIG. 1 is a cross-sectional view of a battery according to the invention prior to the filling with gelled electrolyte solution.
Figure 2:
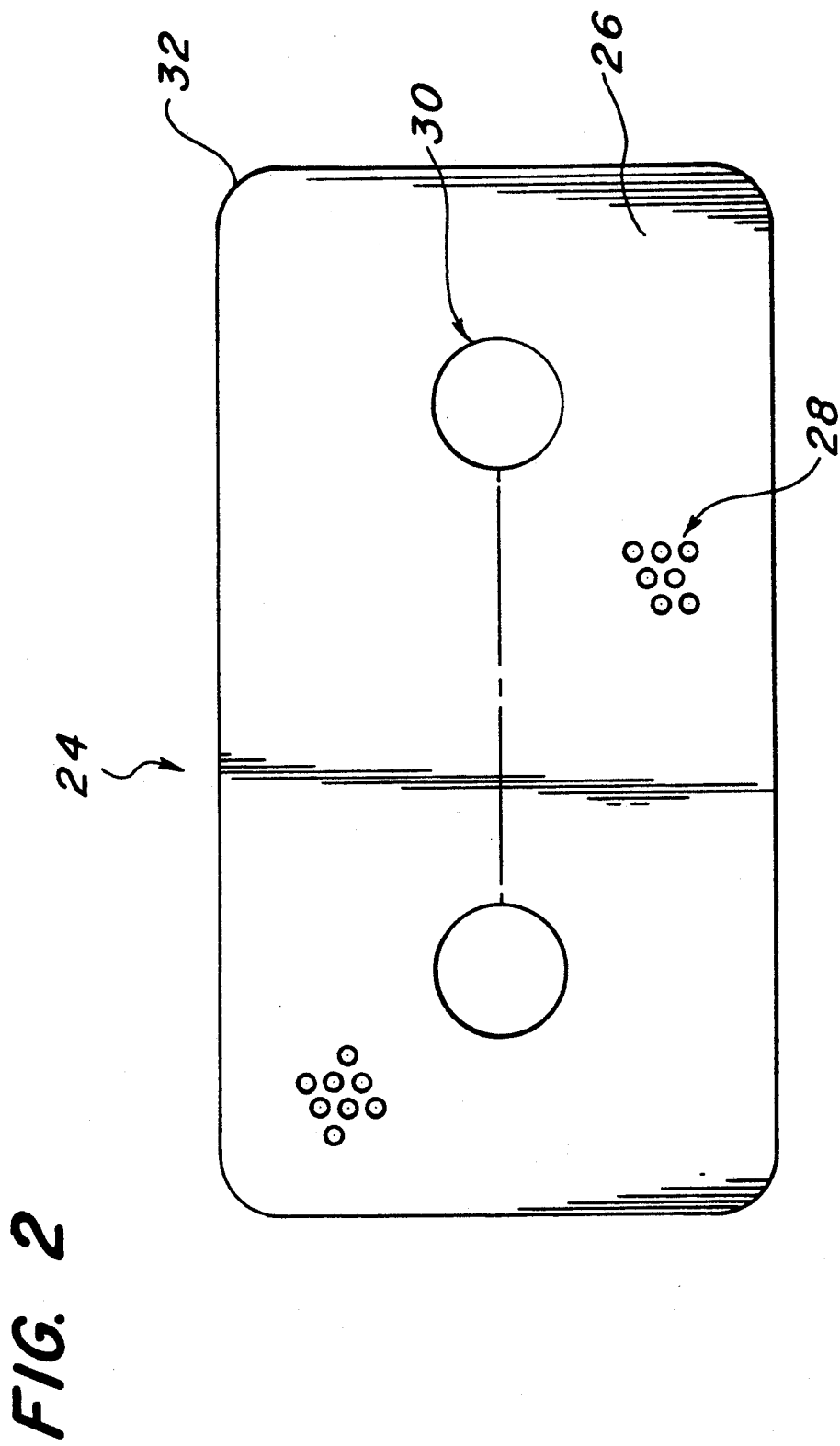
FIG. 2 is a top view of the perforated retainer corresponding to item 24 of FIG. 1.

In FIG. 1, a representative lead-acid battery 10 typically comprises electrochemical elements housed within a container 12 and cover 14. The electrochemical elements include positive and negative polarity electrode plates 16 sandwiched by sheets of separator material 18. The plates of like polarity are interconnected by a strap 20 from which rises one or more terminal posts 22 extending through the cover. A gel-electrolyte retainer, generally designated as 24, comprises a perforated non-conducting sheet 26 as depicted in FIG. 2.

The sheet 26 has a dense pattern of through perforations 28, two holes 30 for the terminal posts, and rounded corners 32 for ease of insertion into the battery container. The sides of the sheet are sized to create a conforming, but not binding, fit with the inner walls of the container, while diameter of the terminal post holes 30 is sized to make a "snap-in" fit into a groove 34milled in each of the posts 22 at a height selected to be locate the sheet just below the surface of the electrolyte. During battery manufacture, the sheet 26 is snapped in over the terminal posts before the container is filled with the liquid electrolyte solution. The solution flows through the perforations to fill around and between the electrode plates. When the solution thickens and dries, the sheet 26 becomes embedded in the gel.

The thickness of the sheet and the size and density of the perforations can be varied to suit the viscosity of the particular gel solution in its liquid state. Relatively small diameter perforations at high density would be generally preferred, but the diameter must be large enough to easily flow the solution during the filling stage. As a workable example, a 0.12 inch thick polypropelyne sheet with a pattern of 0.09 inch diameter perforations in rows and columns of 0.19 inch staggered centers yields about 32 holes per square inch and an effective open area of about 25%, and is used by the applicant for a gel solution in the range of 20-50 centipoises viscosity during the filling operation.

The electrolyte solution eventually thickens and dries into a finished gel with a viscosity of 600-700 centipoises, which cannot penetrate back through the perforations. However, the gel is not a solid mass. As is well known, the gelled mass is porous with fissures and crevices which permit the gas migration necessary to the recombinant process. Excess gasses are permitted to migrate through the gelled material trapped in the perforations, since the retainer sheet is thin and the effective open area relatively large, and accumulate in the open area between the gel and the cover. Typically, a relief valve( depicted generally as 36 in FIG. 1) is located in the cover to regulate internal gas pressure below a safe level.

As can be seen from the above drawings and description, the retainer provides a strengthening support structure for the top surface of the gelled mass, which holds the mass together against crumbling and separation when the battery is mounted horizontally. The battery can be mounted horizontally with any side down. The retainer can be easily inserted during the assembly process, and does not interfere with the electrolyte filling.

We claim:

1. A lead-acid storage battery of the type which employs a gelled electrolyte, comprising:

- a container sealed by a cover;
- a plurality of electrode plates mounted within the container, with plates of like polarity connected to terminal posts extending through the cover;
- a gelled electrolyte disposed throughout the container between and surrounding the electrode plates, and terminating in a surface above the plates such that an open space exists between said surface and the inside of the cover; and
- a retainer embedded in the gelled electrolyte near its said surface and extending substantially over the length and width of the container, the retainer comprising a sheet of non-conducting material perforated by a plurality of through holes of sufficient size and density to allow the electrolyte in its liquid state to flow into the container.

2. A battery as in claim 1, wherein the terminal posts extend through the retainer, and have means for supporting the retainer at the proper height while the liquid electrolyte is flowed into the container.

* * * * *